(12) United States Patent
Ma et al.

(10) Patent No.: US 11,831,860 B2
(45) Date of Patent: Nov. 28, 2023

(54) DISPLAYING DEVICE, DEVICE AND METHOD FOR GENERATING DATA, AND DISPLAYING SYSTEM

(71) Applicants: Beijing BOE Optoelectronics Technology Co., Ltd., Beijing (CN); BOE Technology Group Co., Ltd., Beijing (CN)

(72) Inventors: Zhanshan Ma, Beijing (CN); Xue Dong, Beijing (CN); Hao Zhang, Beijing (CN); Wenhong Tian, Beijing (CN); Ke Li, Beijing (CN); Yuhong Liu, Beijing (CN); Zheng Ge, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 345 days.

(21) Appl. No.: 17/191,118

(22) Filed: Mar. 3, 2021

(65) Prior Publication Data
US 2021/0306612 A1  Sep. 30, 2021

(30) Foreign Application Priority Data
Mar. 24, 2020  (CN) .......................... 202010215289.4

(51) Int. Cl.
*H04N 13/275* (2018.01)
*H04N 13/385* (2018.01)
(Continued)

(52) U.S. Cl.
CPC ........... *H04N 13/275* (2018.05); *G02B 30/54* (2020.01); *H04N 13/243* (2018.05);
(Continued)

(58) Field of Classification Search
CPC .. H04N 13/275; H04N 13/385; H04N 13/305; H04N 13/243; H04N 13/282; H04N 13/398; G02B 30/54
See application file for complete search history.

(56) References Cited

U.S. PATENT DOCUMENTS 4,922,336 A * 5/1990 Morton .................. G02B 30/54
348/E13.058
4,982,092 A * 1/1991 Jehle ...................... G08B 17/12
348/E3.01
(Continued)

FOREIGN PATENT DOCUMENTS

CN       101281298 A     10/2008
CN       202373267 U      8/2012
(Continued)

OTHER PUBLICATIONS

Machine Translation of CN107517371A. (12 pages).
(Continued)

*Primary Examiner* — Charles L Beard
(74) *Attorney, Agent, or Firm* — WHDA, LLP (57) ABSTRACT

A displaying device, a device and method for generating data, and a displaying system. The displaying device includes a displaying screen, a driving assembly, a rotating assembly and a controlling assembly; a rotation shaft of the displaying screen is parallel to a light-exiting face of a display panel; the displaying screen includes a display panel and an optical assembly; a light ray emitted by the display panel includes an emergent light located in a reference plane, and the reference plane is perpendicular to the light-exiting face of the display panel and the rotation shaft of the displaying screen; the optical assembly is configured for adjusting the emergent light located in the reference plane into a collimated light perpendicular to the light-exiting face of the display panel; the rotating assembly is configured for
(Continued)

driving the driving assembly to rotate; and the controlling assembly is electrically connected to the displaying screen.

18 Claims, 6 Drawing Sheets

(51) Int. Cl.
  *H04N 13/305* (2018.01)
  *H04N 13/243* (2018.01)
  *H04N 13/282* (2018.01)
  *H04N 13/398* (2018.01)
  *G02B 30/54* (2020.01)

(52) U.S. Cl.
  CPC ......... *H04N 13/282* (2018.05); *H04N 13/305* (2018.05); *H04N 13/385* (2018.05); *H04N 13/398* (2018.05)

(56) References Cited

U.S. PATENT DOCUMENTS

| | | | | |
|---|---|---|---|---|
| 5,111,313 | A * | 5/1992 | Shires | G02B 5/32 348/E13.059 |
| 5,581,271 | A * | 12/1996 | Kraemer | G09B 9/307 340/980 |
| 5,663,740 | A * | 9/1997 | Brotz | H04N 13/393 348/E13.058 |
| 5,678,910 | A * | 10/1997 | Martin | G02B 30/50 348/E13.058 |
| 5,717,416 | A * | 2/1998 | Chakrabarti | G09G 3/005 345/44 |
| 5,815,314 | A * | 9/1998 | Sudo | H04N 13/349 348/E13.043 |
| 6,052,100 | A * | 4/2000 | Soltan | H04N 13/393 348/E13.058 |
| 6,765,566 | B1 * | 7/2004 | Tsao | H04N 13/363 353/7 |
| 6,801,185 | B2 * | 10/2004 | Salley | G09F 27/00 345/169 |
| 6,940,653 | B2 * | 9/2005 | Favalora | H04N 13/302 359/24 |
| 6,969,174 | B1 * | 11/2005 | Radulescu | G02B 30/54 353/7 |
| 10,192,472 | B1 * | 1/2019 | Nocon | G09G 3/005 |
| 10,339,844 | B1 * | 7/2019 | Nocon | G05B 15/02 |
| 10,969,666 | B1 * | 4/2021 | Haseltine | H04N 9/3194 |
| 11,048,099 | B2 * | 6/2021 | Haseltine | H04N 13/398 |
| 11,074,837 | B2 * | 7/2021 | Nocon | H02J 50/12 |
| 11,074,838 | B2 * | 7/2021 | Hsu | G09G 3/003 |
| 11,106,053 | B2 * | 8/2021 | Wong | G02B 30/56 |
| 2002/0126119 | A1 * | 9/2002 | Tashman | H04N 13/398 348/E13.059 |
| 2003/0020879 | A1 * | 1/2003 | Sonehara | H04N 13/398 348/E13.058 |
| 2003/0030756 | A1 * | 2/2003 | Kane | H04N 9/3132 348/196 |
| 2003/0067421 | A1 * | 4/2003 | Sullivan | H04N 13/388 348/E13.058 |
| 2003/0086167 | A1 * | 5/2003 | Sonehara | H04N 13/324 348/E13.059 |
| 2004/0192430 | A1 * | 9/2004 | Burak | G02B 30/50 463/20 |
| 2005/0024699 | A1 * | 2/2005 | Liu | H04N 9/3129 348/E9.026 |
| 2005/0035962 | A1 * | 2/2005 | Ishibashi | G09G 3/003 345/110 |
| 2005/0062684 | A1 * | 3/2005 | Geng | G09G 3/002 345/32 |
| 2005/0219241 | A1 * | 10/2005 | Chun | H04N 13/363 348/E13.056 |
| 2006/0055887 | A1 * | 3/2006 | Hoshino | G02B 30/40 348/E13.058 |
| 2006/0132497 | A1 * | 6/2006 | Biegelsen | H04N 13/393 345/589 |
| 2006/0171008 | A1 * | 8/2006 | Mintz | H04N 13/363 348/E13.058 |
| 2007/0188862 | A1 * | 8/2007 | Yokosawa | G02B 30/54 359/462 |
| 2008/0036969 | A1 * | 2/2008 | Otsuka | H04N 13/351 348/E13.058 |
| 2008/0043014 | A1 * | 2/2008 | Tachi | G02B 30/54 348/E13.056 |
| 2008/0218854 | A1 * | 9/2008 | Hoshino | H04N 13/302 359/462 |
| 2008/0225235 | A1 * | 9/2008 | Wang | G02B 26/105 359/226.1 |
| 2008/0266523 | A1 * | 10/2008 | Otsuka | H04N 13/363 348/E13.058 |
| 2009/0278918 | A1 * | 11/2009 | Marcus | G02B 30/25 359/464 |
| 2009/0303313 | A1 * | 12/2009 | Yukich | H04N 13/393 348/51 |
| 2010/0114375 | A1 * | 5/2010 | Krieter | G02B 30/54 700/275 |
| 2011/0069157 | A1 * | 3/2011 | Ito | H04N 13/32 348/51 |
| 2011/0199373 | A1 * | 8/2011 | Liu | H04N 13/354 345/419 |
| 2012/0062988 | A1 * | 3/2012 | Watanabe | G09F 27/00 359/462 |
| 2012/0293632 | A1 * | 11/2012 | Yukich | H04N 23/90 348/47 |
| 2013/0010357 | A1 * | 1/2013 | Kobayashi | H04N 13/31 359/463 |
| 2013/0010462 | A1 * | 1/2013 | Kobayashi | H04N 13/31 362/231 |
| 2013/0050198 | A1 * | 2/2013 | Song | F16M 11/08 345/419 |
| 2014/0152672 | A1 * | 6/2014 | Seder | G09G 3/005 345/473 |
| 2015/0042653 | A1 * | 2/2015 | Takaki | G03B 21/10 353/7 |
| 2015/0365663 | A1 * | 12/2015 | Yin | H04N 17/04 348/189 |
| 2017/0034505 | A1 * | 2/2017 | Fusama | H04N 13/128 |
| 2017/0223344 | A1 * | 8/2017 | Kaehler | G02B 30/54 |
| 2018/0039050 | A1 * | 2/2018 | Rose | H04N 13/243 |
| 2018/0192043 | A1 * | 7/2018 | Ji | H04N 13/305 |
| 2019/0094021 | A1 * | 3/2019 | Singer | G01C 15/008 |
| 2019/0235261 | A1 * | 8/2019 | Stojetz | H04N 13/307 |
| 2019/0243153 | A1 * | 8/2019 | Haseltine | G02B 30/56 |
| 2020/0057312 | A1 * | 2/2020 | Jia | G02F 1/133528 |
| 2020/0195911 | A1 * | 6/2020 | Haseltine | H04N 13/305 |
| 2020/0387931 | A1 * | 12/2020 | Bastiyali | G06Q 30/0265 |
| 2021/0005123 | A1 * | 1/2021 | Valente | G02B 27/0172 |
| 2021/0020079 | A1 * | 1/2021 | Nocon | G09F 13/30 |
| 2021/0080766 | A1 * | 3/2021 | Nocon | G02B 30/54 |
| 2021/0096391 | A1 * | 4/2021 | Ma | G02B 30/54 |
| 2021/0096392 | A1 * | 4/2021 | Huang | G02B 30/54 |
| 2021/0193067 | A1 * | 6/2021 | Shao | G09G 3/3685 |
| 2021/0344894 | A1 * | 11/2021 | Stokes | G09G 3/32 |
| 2022/0078397 | A1 * | 3/2022 | Shao | H04N 13/296 |
| 2022/0094905 | A1 * | 3/2022 | Lv | G06F 17/10 |
| 2022/0139344 | A1 * | 5/2022 | Shao | G09G 3/005 345/204 |
| 2022/0327983 | A1 * | 10/2022 | Lv | G09G 3/001 |
| 2022/0334385 | A1 * | 10/2022 | Lu | G02B 30/54 |
| 2022/0377314 | A1 * | 11/2022 | Shao | H04N 13/398 |

FOREIGN PATENT DOCUMENTS

| | | |
|---|---|---|
| CN | 106094232 A | 11/2016 |
| CN | 107517371 A | 12/2017 |
| CN | 108196375 A | 6/2018 |
| JP | 2003140086 A | 5/2003 |

(56) References Cited

FOREIGN PATENT DOCUMENTS

KR 20050088768 A 9/2005
WO WO-2018200417 A1 * 11/2018

OTHER PUBLICATIONS

Machine Translation of CN108196375. (11 pages).
Machine Translation of CN106094232. (3 pages).
Machine Translation of CN202373267. (5 pages).
English Abstract of KR20050088768. (1 page).
Machine Translation of JP2003140086. (8 pages).
Office Action dated Jun. 2, 2021, issued in counterpart CN Application No. 202010215289.4, with English translation. (22 pages).

\* cited by examiner

DISPLAYING DEVICE, DEVICE AND METHOD FOR GENERATING DATA, AND DISPLAYING SYSTEM

CROSS REFERENCE TO RELEVANT APPLICATIONS

The present disclosure claims the priority of the chinese patent application filed on Mar. 24, 2020 before the Chinese Patent Office with the application number of 202010215289.4 and the title of "DISPLAYING DEVICE, DEVICE AND METHOD FOR GENERATING DATA, AND DISPLAYING SYSTEM", which is incorporated herein in its entirety by reference.

TECHNICAL FIELD

The present disclosure relates to the technical field of displays, and particularly relates to a displaying device, a device and method for generating data, and a displaying system.

BACKGROUND

With the development of science and technology, the 3D (three-dimensional) display technique has become a hot research area.

SUMMARY

The embodiments of the present disclosure provide a displaying device, a device and method for generating data, and a displaying system.

In a first aspect, there is provided a displaying device, wherein the displaying device comprises: a displaying screen, a driving assembly, a rotating assembly and a controlling assembly;

two sides of the driving assembly are individually fixed to the displaying screen and the rotating assembly; the displaying screen is rotatable with rotation of the driving assembly; and a rotation shaft of the displaying screen is parallel to a light-exiting face of a display panel:

the displaying screen comprises the display panel and an optical assembly that is located on the light-exiting face of the display panel; a light ray emitted by the display panel comprises an emergent light located in a reference plane, and the reference plane is perpendicular to the light-exiting face of the display panel and the rotation shaft of the displaying screen; the optical assembly is configured for adjusting the emergent light located in the reference plane into a collimated light perpendicular to the light-exiting face of the display panel; and the displaying screen is configured for displaying an inputted image during rotation;

the rotating assembly is configured for driving the driving assembly to rotate; and the controlling assembly is electrically connected to the displaying screen, and is configured for, during rotation of the displaying screen, inputting to the displaying screen sequentially data of a plurality of different two-dimensional images that are obtained by rendering of a three-dimensional graphic to be displayed, wherein an time interval between the inputs of the data of any neighboring two of the two-dimensional images is less than or equal to a human-eye visual-persistence duration.

Optionally, a product between a plane value required for rendering the three-dimensional graphic to be displayed and a rotational speed of the rotating assembly has a linear relation with a refresh rate of the displaying screen, and a plane value required for rendering the three-dimensional graphic to be displayed is related to a viewing distance and an interpupillary distance of a person.

Optionally, if it is set that the refresh rate of the displaying screen is M, the rotational speed of the rotating assembly is N, the plane value required for rendering the three-dimensional graphic to be displayed is S, the viewing distance is D, and the interpupillary distance of the person is L, then M=NS, and S≥[360/2 arctan(L/2D)], wherein [ ] represents rounding up to an integer.

Optionally, S=a[360/2 arctan(I2D)], and a is a positive integer.

Optionally, a rotational speed of the rotating assembly is greater than or equal to 24 rps.

Optionally, the optical assembly is any one of a columnar array lens, a peep-proof protection film or a unidirectional grating.

Optionally, the displaying device further comprises: an electric-power supplying assembly, wherein the electric-power supplying assembly is for supplying electric power to the displaying screen and the controlling assembly.

Optionally, the displaying device further comprises a base, a displaying-screen support and connectors;

the rotating assembly comprises an electric motor, the driving assembly comprises a turnplate, and the controlling assembly comprises a circuit board; and the electric-power supplying assembly comprises: a wireless-electric-power-supply emitting support, an emitting coil provided on the wireless-electric-power-supply emitting support, a wireless-electric-power-supply receiving support, and a receiving coil provided on the wireless-electric-power-supply receiving support;

the wireless-electric-power-supply emitting support is provided on the base, and the electric motor passes through a through-hole area in a center of the wireless-electric-power-supply emitting support and is arranged on the base;

the wireless-electric-power-supply receiving support and the turnplate are sequentially provided on the electric motor, and are individually connected to a main shaft of the electric motor by the connectors; and the displaying screen is provided on the displaying-screen support, the displaying-screen support is provided on the turnplate, and the circuit board is provided on one side of the turnplate that is further away from the displaying screen.

Optionally, the displaying device further comprises: a light screen, wherein the light screen is provided between the displaying-screen support and the turnplate.

Optionally, the displaying device further comprises: a transparent protective cover, wherein the displaying screen is located inside a space formed by the transparent protective cover.

In a second aspect, there is provided a displaying method using the displaying device, wherein the displaying method comprises:

during rotation of the displaying screen, inputting to the displaying screen sequentially a plurality of different two-dimensional images that are obtained by rendering of a three-dimensional graphic to be displayed, wherein an time interval between the inputs of any neighboring two of the two-dimensional images is less than or equal to a human-eye visual-persistence duration; and controlling the displaying screen to display the inputted images.

In a third aspect, there is provided a calculating and processing device, wherein the calculating and processing device comprises:

a memory storing a computer-readable code; and one or more processors, wherein when the computer-readable code is executed by the one or more processors, the calculating and processing device implements the displaying method stated above.

In a forth aspect, there is provided a computer program, wherein the computer program comprises a computer-readable code, and when the computer-readable code is executed on a calculating and processing device, the computer-readable code causes the calculating and processing device to implement the displaying method stated above.

In a fifth aspect, there is provided a device for generating data, wherein the device comprises:

an image acquiring module configured for acquiring, from different angles, data of a plurality of different two-dimensional images of a three-dimensional graphic to be displayed; and an outputting module configured for outputting the data of the plurality of different two-dimensional images to the controlling assembly of the displaying device stated above.

Optionally, the image acquiring module comprises a plurality of cameras;

the plurality of cameras surround the three-dimensional graphic to be displayed, and the cameras are configured for rendering the three-dimensional graphic to be displayed from the angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the outputting module is configured for numbering the data of the plurality of different two-dimensional images, and outputting the numbered data of the plurality of different two-dimensional images to the controlling assembly of the displaying device stated above.

In a sixth aspect, there is provided a method for generating data, wherein the method is applied to the device for generating data stated above, and the method comprises:

acquiring, from different angles, data of a plurality of different two-dimensional images of a three-dimensional graphic to be displayed; and outputting the data of the plurality of different two-dimensional images to the controlling assembly of the displaying device stated above.

Optionally, the step of acquiring, from the different angles, the data of the plurality of different two-dimensional images of the three-dimensional graphic to be displayed comprises:

by using a plurality of cameras that surround the three-dimensional graphic to be displayed, rendering the three-dimensional graphic to be displayed from angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the step of outputting the data of the plurality of different two-dimensional images to the controlling assembly of the displaying device stated above comprises:

numbering the data of the plurality of different two-dimensional images, and outputting the numbered data of the plurality of different two-dimensional images to the controlling assembly of the displaying device stated above.

In a seven aspect, there is provided a calculating and processing device, wherein the calculating and processing device comprises:

a memory storing a computer-readable code; and one or more processors, wherein when the computer-readable code is executed by the one or more processors, the calculating and processing device implements the method for generating data stated above.

In an eighth aspect, there is provided a displaying system, wherein the displaying system comprises: the displaying device stated above and a device for generating data, wherein the device comprises:

an image acquiring module configured for acquiring, from different angles, data of a plurality of different two-dimensional images of a three-dimensional graphic to be displayed; and an outputting module configured for outputting the data of the plurality of different two-dimensional images to the controlling assembly of the displaying device stated above; and the device for generating data is electrically connected to the controlling assembly of the displaying device.

Optionally, the image acquiring module comprises a plurality of cameras;

the plurality of cameras surround the three-dimensional graphic to be displayed, and the cameras are configured for rendering the three-dimensional graphic to be displayed from the angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the outputting module is configured for numbering the data of the plurality of different two-dimensional images, and outputting the numbered data of the plurality of different two-dimensional images to the controlling assembly of the displaying device stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, the meaning of "plurality of" is two or more, unless explicitly and clearly defined otherwise. In addition, the terms that indicate orientation or position relations, such as "upper" and "lower", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

Figure 1:
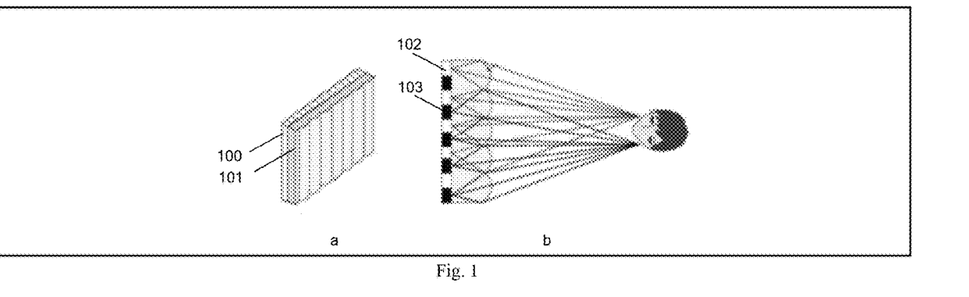
FIG. 1 is a schematic diagram of a 3D displaying device.

There are mainly two types of naked-eye 3D displaying devices. In the first type, referring to FIG. 1a, a columnar lens 101 is provided on the displaying screen 100. Referring to FIG. 1b, the light rays emitted by the displaying screen, after passing through the columnar lens, have a certain directivity; in other words, the light ray emitted by the white area 102 of the displaying screen enters the right eye of the person, and the light ray emitted by the black area 103 of the displaying screen enters the left eye of the person. The image displayed by the white area 102 of the displaying screen and the image displayed by the black area 103 are different, whereby the left and right eyes of the person see different images at the same time, which results in parallax, thereby providing the stereoscopic vision. However, the field angles of the columnar-lens displaying device are limited, and it can merely display one view of the 3D graphic, and cannot exhibit the complete information of the 3D graphic. Moreover, the transverse resolution is reduced to a half, which results in a poor effect of displaying.

Figure 2:
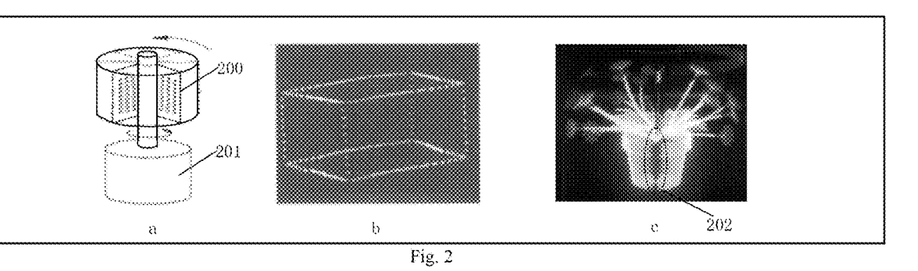
FIG. 2 is a schematic diagram of another 3D displaying device.

In the second type, referring to FIG. 2a, an electrode 201 drives a Light Emitting Diode (LED) screen 200 to rotate, and the image is formed by using the visual-persistence effect, thereby outlining a complete stereoscopic graphic in the space. As compared with the columnar-lens displaying device, the rotating-LED displaying device has a large field angle, and its resolution is not reduced. However, the rotating-LED displaying device easily has the following problems. Referring to FIG. 2b, the light behind the image will transmit to the human eyes, whereby the human eyes see a cubic perspective view. Referring to FIG. 2c, no image is displayed at the center area 202 of the flowerpot, which results in a central dead zone. Additionally, the problem of stray light exists at the periphery of the flowerpot. Those problems seriously deteriorate the effect of the 3D displaying, and affect the user experience.

Figure 3:
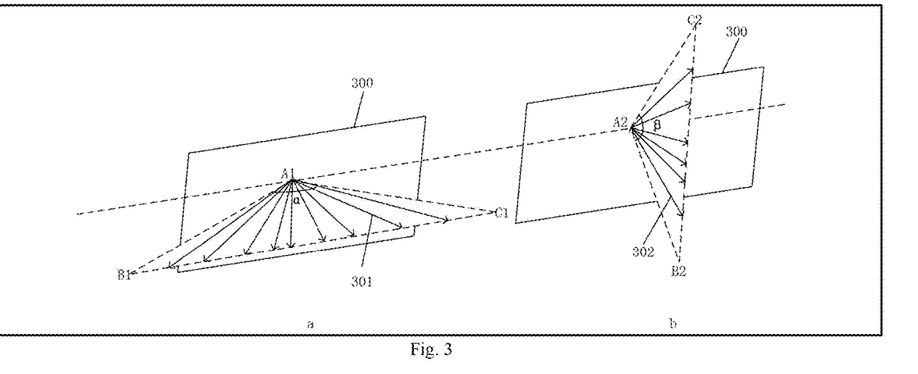
FIG. 3 is a schematic diagram of the field angle of the display panel according to an embodiment of the present disclosure.

Considering the above reality, an embodiment of the present disclosure provides a displaying device. Referring to FIG. 3, the displaying device comprises: a displaying screen, a driving assembly, a rotating assembly and a controlling assembly.

Two sides of the driving assembly are individually fixed to the displaying screen and the rotating assembly. The displaying screen is rotatable with rotation of the driving assembly. A rotation shaft of the displaying screen is parallel to a light-exiting face of a display panel.

The displaying screen comprises the display panel and an optical assembly that is located on the light-exiting face of the display panel. The light ray emitted by the display panel comprises an emergent light located in a reference plane, and the reference plane is perpendicular to the light-exiting face of the display panel and the rotation shaft of the displaying screen. The optical assembly is configured for adjusting the emergent light located in the reference plane into a collimated light perpendicular to the light-exiting face of the display panel. The displaying screen is configured for displaying an inputted image during rotation.

The rotating assembly is configured for driving the driving assembly to rotate.

The controlling assembly is electrically connected to the displaying screen, and is configured for, during rotation of the displaying screen, inputting to the displaying screen sequentially the data of a plurality of different two-dimensional images that are obtained by the rendering of a three-dimensional graphic to be displayed, wherein the time interval between the inputs of the data of any neighboring two of the two-dimensional images is less than or equal to a human-eye visual-persistence duration.

In the displaying device, the displaying screen may be a Micro LED displaying screen, or a Mini LED displaying screen, or an Organic Light-Emitting Diode (OLED) displaying screen, which is not limited here.

The particular structure of the optical assembly is not limited, provided that it can adjust the emergent light located in the reference plane into a collimated light perpendicular to the light-exiting face of the display panel.

Figure 5:
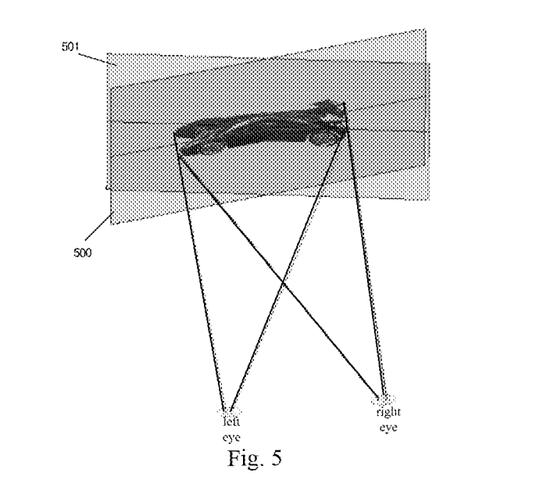
FIG. 5 is a visual figure based on parallax according to an embodiment of the present disclosure.

Referring to FIG. 3, the field angle (FOV) of the display panel 300 comprises a horizontal field angle α (referring to FIG. 3a) and a vertical field angle β (referring to FIG. 3b). The purpose of providing the optical assembly herein is to set the horizontal field angle to be approximately 0 degree, to realize that the human eyes can see the image merely when the human eyes are directly facing the displaying screen, and cannot see the image at any other horizontal field angles. In other words, referring to FIG. 5, when the left eye is directly facing the displaying screen, the left eye sees the image 501, but at the moment the right eye is not directly facing the displaying screen, and thus cannot see the image 501. Because the displaying screen is continuously rotating and continuously refreshing the images, when the right eye is directly facing the displaying screen, the right eye sees the image 500, but at the moment the left eye is not directly facing the displaying screen, and thus cannot see the image 500. Because of the visual-persistence effect of human eye, the left eye still keeps the visual information of the image 501, and, therefore, when the viewer is in a fixed position, the two eyes individually capture the image 500 and the image 501, which results in parallax, thereby providing the stereoscopic vision. The optical assembly does not change the vertical field angle of the display panel. FIG. 3*a* illustrates by merely taking the emergent light ray 301 located in the plane A1B1C1 as the example, and FIG. 3*b* illustrates by merely taking the emergent light ray 302 located in the plane A2B2C2 as the example.

Figure 4:
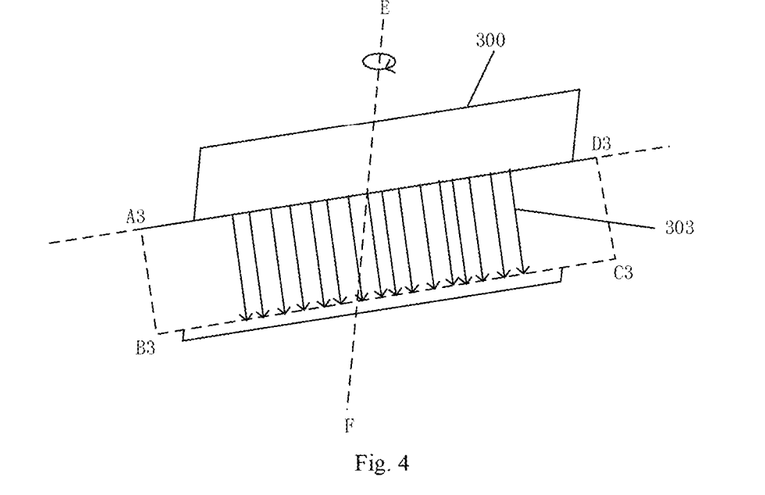
FIG. 4 is a schematic diagram of the emergent light ray of the display panel according to an embodiment of the present disclosure.

If the displaying screen is arranged vertically on a horizontal plane, then all of the emergent lights on the light-exiting face of the display panel include an emergent light located in a reference plane parallel to the horizontal plane and an emergent light located in a vertical plane perpendicular to the horizontal plane, the rotation shaft (labeled as EF in FIG. 4) of the displaying screen is parallel to the vertical direction, and the light-exiting face of the display panel is parallel to a vertical plane. At this point, the reference plane is parallel to the horizontal plane. Referring to FIG. 4, the optical assembly is configured for adjusting the emergent light located in the plane A3B3C3D3 parallel to the horizontal plane into a collimated light (comprising a plurality of parallel light rays 303) perpendicular to the light-exiting face of the display panel. Certainly, the displaying screen may also be arranged in another direction, and here the vertical arrangement of the displaying screen in the horizontal plane is merely used as an example for the description.

Referring to FIG. 4, the light ray of the display panel 300 that is located in the reference plane A3B3C3D3 passes through the optical assembly (not shown in FIG. 4) and then is adjusted into a collimated light perpendicular to the light-exiting face of the display panel. The display panel 300 rotates clockwise or anticlockwise with the rotation shaft EF as the axis.

The light emitted by the light-exiting face of the display panel is generally divergent; in other words, two light rays that are adjacent at the beginning will become increasingly further way from each other in the propagation. Referring to FIG. 4, the plurality of light rays 303 in the collimated light are parallel.

The plurality of different two-dimensional images that are obtained by the rendering of the three-dimensional graphic to be displayed refer to that: after the three-dimensional graphic to be displayed has been rendered, a plurality of two-dimensional planar images having different field angles are generated from a three-dimensional stereoscopic model; in other words, the three-dimensional-graphic information is converted into two-dimensional-graphic information. The rendering is generally performed by using a professional 3D software.

The visual persistence in the above-described human-eye visual-persistence duration refers to that: When a human eye is observing an object, the transmission of the optical signal into the brain nerve spends a short time duration; in other words, after the action of the light has ended, the visual image does not disappear immediately. Such a residuary visual is referred to as "after image", and such a phenomenon of vision is referred to as "visual persistence". Generally, the human-eye visual-persistence duration is approximately 0.1s to 0.4s. In order to ensure the effect of displaying of the displaying device, the human-eye visual-persistence duration may be set to be 0.1s.

An embodiment of the present disclosure provides a displaying device, wherein the displaying device comprises: a displaying screen, a driving assembly, a rotating assembly and a controlling assembly; two sides of the driving assembly are individually fixed to the displaying screen and the rotating assembly; the displaying screen is rotatable with rotation of the driving assembly; and a rotation shaft of the displaying screen is parallel to a light-exiting face of a display panel; the displaying screen comprises the display panel and an optical assembly that is located on the light-exiting face of the display panel; a light ray emitted by the display panel comprises an emergent light located in a reference plane, and the reference plane is perpendicular to the light-exiting face of the display panel and the rotation shaft of the displaying screen; the optical assembly is configured for adjusting the emergent light located in the reference plane into a collimated light perpendicular to the light-exiting face of the display panel; and the displaying screen is configured for displaying an inputted image during rotation; the rotating assembly is configured for driving the driving assembly to rotate; and the controlling assembly is electrically connected to the displaying screen, and is configured for, during rotation of the displaying screen, inputting to the displaying screen sequentially data of a plurality of different two-dimensional images that are obtained by rendering of a three-dimensional graphic to be displayed, wherein an time interval between the inputs of the data of any neighboring two of the two-dimensional images is less than or equal to a human-eye visual-persistence duration.

Because the optical assembly is provided on the light-exiting face of the display panel, the light rays emitted by the display panel, after passing through the optical assembly, have a certain directivity, whereby the human eyes can see the image displayed on the displaying screen merely when the human eyes are directly facing the displaying screen, and, therefore, the problems of the stray light, the central dead zone and the transmission of the light behind the image to the human eyes are prevented. During rotation of the displaying screen, the displaying screen sequentially displays a plurality of different two-dimensional images that are obtained by rendering, and, therefore, when the viewer is viewing the displaying screen, the two eyes capture different two-dimensional images, which results in parallax, thereby providing the stereoscopic vision. Further, when the viewer is moving around the displaying device, at different positions he can see two different images that have parallax, which form different stereoscopic graphics, thereby obtaining the complete information of the three-dimensional graphic. The displaying device can realize a three-dimensional stereoscopic-vision effect of no dead zone and no stray light in 360° without requiring the user to wear 3D glasses, and without requiring to reduce the resolution, thereby greatly improving the effect of the 3D displaying, and thus improving the user experience.

Optionally, the product between the plane value required for rendering the three-dimensional graphic to be displayed and the rotational speed of the rotating assembly has a linear relation with the refresh rate of the displaying screen, and the plane value required for rendering the three-dimensional graphic to be displayed is related to the viewing distance and the interpupillary distance of a person. The plane value required for rendering the three-dimensional graphic to be displayed, as used herein, refers to, within the visual-angle range of 360°, the quantity of the field angles at which a stable two-dimensional image of the three-dimensional graphic to be displayed is acquired.

Further optionally, if it is set that the refresh rate of the displaying screen is M, the rotational speed of the rotating assembly is N, the plane value required for rendering the three-dimensional graphic to be displayed is S, the viewing distance is D, and the interpupillary distance of the person is L, then M=NS, and S≥[360/2 arctan(L/2D)], wherein [ ] represents rounding up to an integer.

Figure 6:
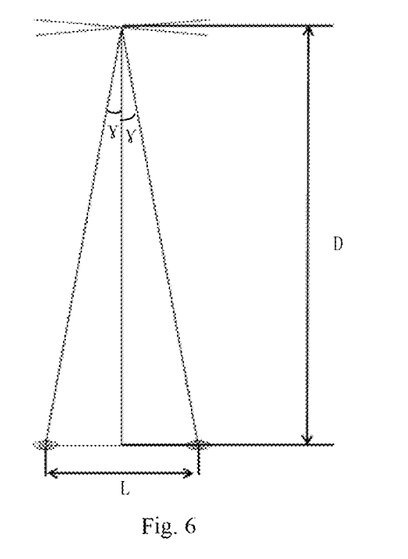
FIG. 6 is a schematic diagram of the interpupillary distance and the viewing distance according to an embodiment of the present disclosure.

Referring to FIG. 6, if the field angle of a single eye viewing an image is γ and tan γ=0.5 L/D, then γ=arctan(L/2D), and the field angle of the two eyes viewing the image is 2γ. If it is required to obtain the information of all of the field angles of the three-dimensional stereoscopic graphic, the information of at least 360/2 arctan(L/2D) planes is required. In order to facilitate the calculation, the operation of rounding up to an integer is used to obtain an integer quantity of the plane values.

Referring to FIG. 6, the interpupillary distance is set to be 63 mm, the typical value of the interpupillary distances of Asian, and it is assumed that the viewing distance is 500 mm. Accordingly, according to 360/2 arctan(L/2D), it can be calculated that the value of S is 49.9, which it rounded to 50. In other words, if the user is observing the displaying device at the distance of 0.5 m, it is required to provide at least 50 planes.

In order to obtain richer information of the three-dimensional graphic, further optionally, S=a[360/2 arctan(L/2D)], and a is a positive integer. In other words, when the minimum value of S has been calculated out, the value of S is expanded by integer multiples. The a may be set to be 1, 2, 3 and so on. As an example, if the minimum value of S is 50, when a is set to be 2, 3 and 4, the corresponding values of S are 100, 150 and 200 respectively.

Optionally, the rotational speed of the rotating assembly is greater than or equal to 24 rps. As an example, the rotational speed of the rotating assembly is 24 rps or 60 rps.

Figure 7:
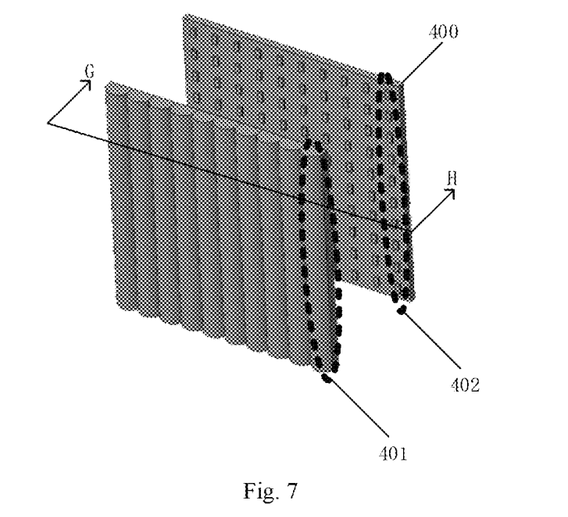
FIG. 7 is a schematic structural diagram of the displaying screen according to an embodiment of the present disclosure.
Figure 8:
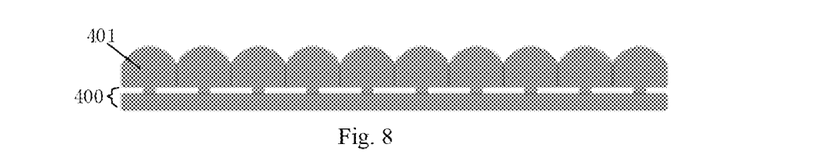
FIG. 8 is a cross-sectional schematic view along GH in FIG. 7.

Optionally, the optical assembly is any one of a columnar array lens, a peep-proof protection film or a unidirectional grating. If the optical assembly is a columnar array lens, the columnar array lens may, referring to FIG. 7, comprise a plurality of columnar lens units 401 that are provided in parallel, wherein each of the columnar lens units 401 corresponds to one column of sub-pixels 402 of the display panel 400. The cross-sectional view of the columnar array lens along the GH may be shown in FIG. 8, wherein the cross section of the columnar lens units 401 is a paraboloid. FIG. 7 illustrates by taking a Mini LED displaying screen as the example.

Optionally, the displaying device further comprises: an electric-power supplying assembly, wherein the electric-power supplying assembly is for supplying electric power to the displaying screen and the controlling assembly. The electric-power supplying assembly may employ a wired electric-power supplying mode, and may also employ a wireless electric-power supplying mode. In order to prevent the power cords from winding together in the rotation, the wireless electric-power supplying mode may be selected.

Figure 9:
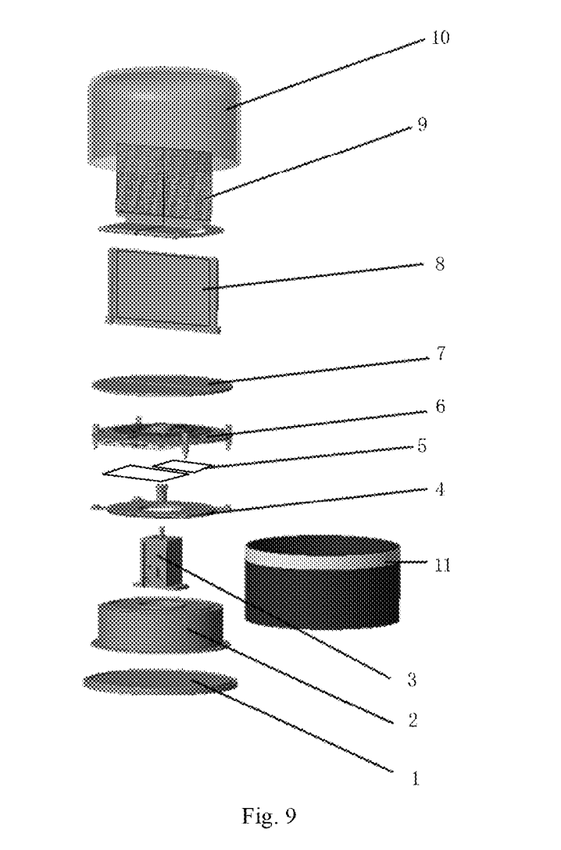
FIG. 9 is an exploded view of the structure of the displaying device according to an embodiment of the present disclosure.

Optionally, referring to FIG. 9, the displaying device further comprises a base 1, a displaying-screen support 8 and connectors (not shown in FIG. 9).

The rotating assembly comprises an electric motor 3. The driving assembly comprises a turnplate 5. The controlling assembly comprises a circuit board 5. The electric-power supplying assembly comprises: a wireless-electric-power-supply emitting support 2, an emitting coil (not shown in FIG. 9) provided on the wireless-electric-power-supply emitting support, a wireless-electric-power-supply receiving support 4, and a receiving coil (not shown in FIG. 9) provided on the wireless-electric-power-supply receiving support.

The wireless-electric-power-supply emitting support 2 is provided on the base 1, and the electric motor 3 passes through a through-hole area in the center of the wireless-electric-power-supply emitting support 2 and is arranged on the base 1.

The wireless-electric-power-supply receiving support 4 and the turnplate 6 are sequentially provided on the electric motor 3, and are individually connected to the main shaft of the electric motor 3 by the connectors.

The displaying screen 9 is provided on the displaying-screen support 8. The displaying-screen support 8 is provided on the turnplate 6. The circuit board 5 is provided on one side of the template 6 that is further away from the displaying screen 9.

It should be noted that, because the electric motor has a large electricity consumption, the electric power is generally obtained from an external power source.

Optionally, referring to FIG. 9, in order to shield and protect the driving assembly and so on under it, the displaying device further comprises: a light screen 7, wherein the light screen 7 is provided between the displaying-screen support 8 and the turnplate 6.

Optionally, referring to FIG. 9, in order to protect the displaying screen, the displaying device further comprises: a transparent protective cover 10, wherein the displaying screen 9 is located inside the space formed by the transparent protective cover 10.

Figure 10:
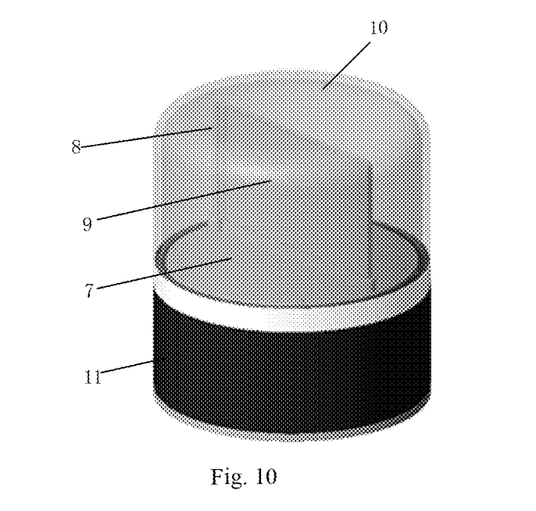
FIG. 10 is a schematic structural diagram after the structure in FIG. 9 has been assembled.

Certainly, in order to improve the aesthetic degree and protect the related assemblies, referring to FIGS. 9 and 10, the displaying device further comprises: a housing 11, wherein the housing encircles the rotating assembly, the driving assembly and the controlling assembly. FIG. is a schematic diagram of the overall appearance of the displaying device. FIG. 9 is an exploded structural diagram of the components of the displaying device.

An embodiment of the present disclosure provides a displaying method using the displaying device stated in the above embodiments. The method comprises:

S101: during rotation of the displaying screen, inputting to the displaying screen sequentially a plurality of different two-dimensional images that are obtained by rendering of a three-dimensional graphic to be displayed, wherein an time interval between the inputs of any neighboring two of the two-dimensional images is less than or equal to a human-eye visual-persistence duration; and S102: controlling the displaying screen to display the inputted images.

The displaying method is simple and easy to implement, and has a good effect of 3D displaying.

Figure 11:
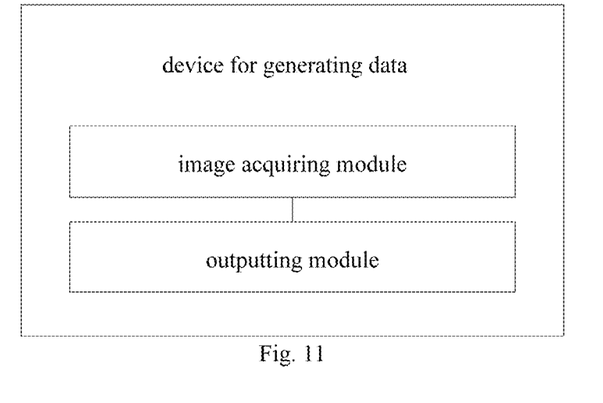
FIG. 11 is a schematic diagram of the device for generating data according to an embodiment of the present disclosure.

Referring to FIG. 11, an embodiment of the present disclosure provides a device for generating data, wherein the device comprises:

an image acquiring module configured for acquiring, from different angles, data of a plurality of different two-dimensional images of a three-dimensional graphic to be displayed; and an outputting module configured for outputting the data of the plurality of different two-dimensional images to the controlling assembly of the displaying device stated in the above embodiments.

An embodiment of the present disclosure provides a device for generating data, wherein the device for generating data can generate and output the data of a plurality of different two-dimensional images of the three-dimensional graphic to be displayed.

Optionally, the image acquiring module comprises a plurality of cameras.

Figure 12:
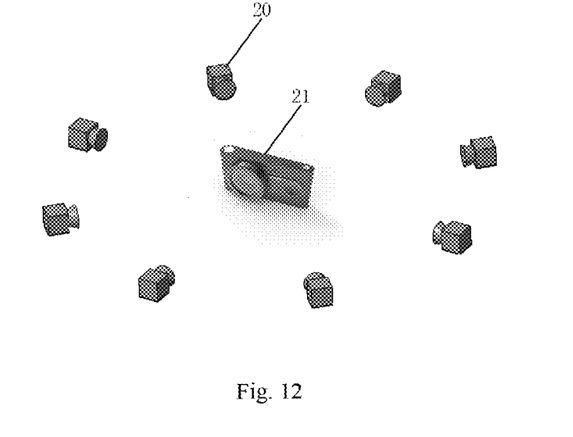
FIG. 12 is a diagram of the distribution of the cameras.

Referring to FIG. 12, the plurality of cameras 20 surround the three-dimensional graphic 21 to be displayed, and the cameras are configured for rendering the three-dimensional graphic to be displayed from angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed. In FIG. 12, a photographic camera is used as the three-dimensional graphic 21 to be displayed. Certainly, the three-dimensional graphic 21 to be displayed may also be another three-dimensional graphic, and here the photographic camera is merely used as an example for the description.

The quantity of the cameras is equal to the plane value required for rendering the three-dimensional graphic to be displayed. Moreover, the method for calculating the plane value required for rendering the three-dimensional graphic to be displayed may refer to the related contents of the above embodiments, and is not discussed here further.

If the intersection point of the optical axes of the plurality of cameras coincides with the center point of the three-dimensional graphic to be displayed, the stereoscopic graphic appears at the center position of the displaying screen, which results in a better effect of displaying.

The outputting module is configured for numbering the data of the plurality of different two-dimensional images, and outputting the numbered data of the plurality of different two-dimensional images to the controlling assembly of the displaying device stated in the above embodiments.

An embodiment of the present disclosure provides a method for generating data, wherein the method is applied to the device for generating data stated in the above embodiments, and the method comprises:

S01: acquiring, from different angles, data of a plurality of different two-dimensional images of a three-dimensional graphic to be displayed; and S02: outputting the data of the plurality of different two-dimensional images to the controlling assembly of the displaying device stated in the above embodiments.

The method can generate and output the data of a plurality of different two-dimensional images of the three-dimensional graphic to be displayed. The method is simple and easy to implement.

Optionally, the S01: acquiring, from different angles, data of a plurality of different two-dimensional images of a three-dimensional graphic to be displayed comprises:

by using a plurality of cameras that surround the three-dimensional graphic to be displayed, rendering the three-dimensional graphic to be displayed from angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the S02: outputting the data of the plurality of different two-dimensional images to the controlling assembly of the displaying device stated in the above embodiments comprises:

numbering the data of the plurality of different two-dimensional images, and outputting the numbered data of the plurality of different two-dimensional images to the controlling assembly of the displaying device stated in the above embodiments.

An embodiment of the present disclosure provides a displaying system, wherein the displaying system comprises: the displaying device stated in the above embodiments and the device for generating data stated in the above embodiments; and the device for generating data is electrically connected to the controlling assembly of the displaying device.

The displaying system can realize a three-dimensional stereoscopic-vision effect of no dead zone and no stray light in 360° without requiring the user to wear 3D glasses, thereby greatly improving the effect of the 3D displaying, and thus improving the user experience.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 13:
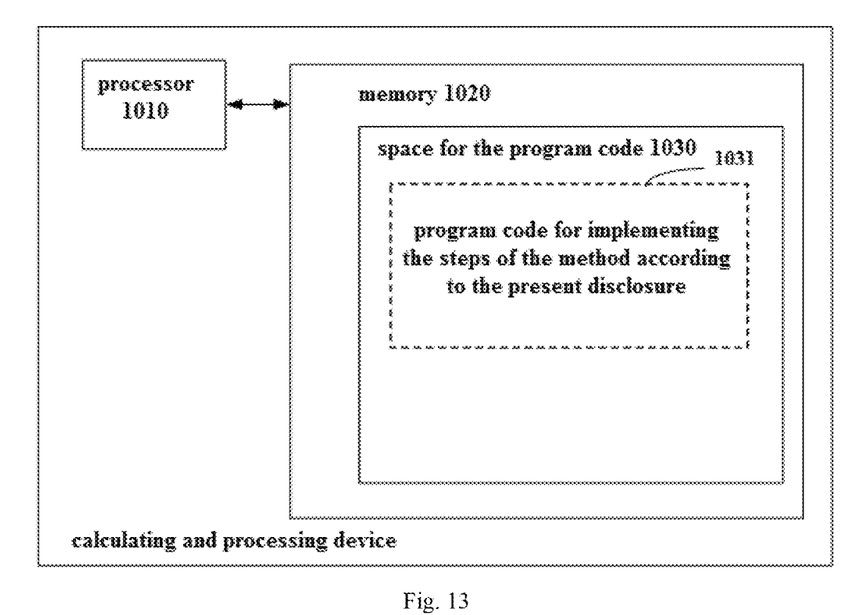
FIG. 13 schematically shows a block diagram of a calculating and processing device for implementing the method according to the present disclosure.
Figure 14:
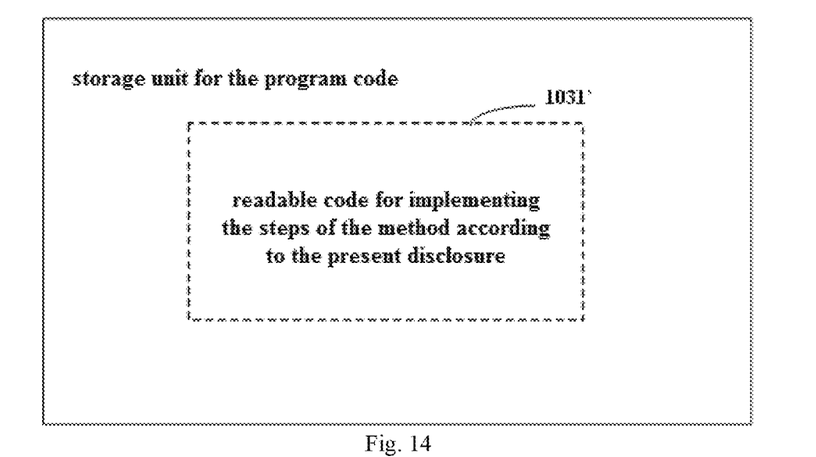
FIG. 14 schematically shows a storage unit for maintaining or carrying a program code for implementing the method according to the present disclosure.

For example, FIG. 13 shows a calculating and processing device that can implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 14. Such computer program products are usually portable or fixed storage units. The storage unit may have storage segments or storage spaces with similar arrangement to the memory 1020 of the calculating and processing device in FIG. 13. The program codes may for example be compressed in a suitable form. Generally, the storage unit contains a computer-readable code 103I', which can be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A displaying device, wherein the displaying device comprises: a displaying screen, a driving assembly, a rotating assembly and a controlling assembly;
   two sides of the driving assembly are individually fixed to the displaying screen and the rotating assembly; the displaying screen is rotatable with rotation of the driving assembly; and a rotation shaft of the displaying screen is parallel to a light-exiting face of a display panel;
   the displaying screen comprises the display panel and an optical assembly that is located on the light-exiting face of the display panel; a light ray emitted by the display panel comprises an emergent light located in a reference plane, and the reference plane is perpendicular to the light-exiting face of the display panel and the rotation shaft of the displaying screen; the optical assembly is configured for adjusting the emergent light located in the reference plane into a collimated light perpendicular to the light-exiting face of the display panel; and the displaying screen is configured for displaying an inputted image during rotation;
   the rotating assembly is configured for driving the driving assembly to rotate; and
   the controlling assembly is electrically connected to the displaying screen, and is configured for, during rotation of the displaying screen, inputting to the displaying screen sequentially data of a plurality of different two-dimensional images that are obtained by rendering of a three-dimensional graphic to be displayed, wherein an time interval between the inputs of the data of any neighboring two of the two-dimensional images is less than or equal to a human-eye visual-persistence duration;
   wherein a product between a plane value required for rendering the three-dimensional graphic to be displayed and a rotational speed of the rotating assembly has a linear relation with a refresh rate of the displaying screen, and a plane value required for rendering the three-dimensional graphic to be displayed is related to a viewing distance and an interpupillary distance of a person;
   wherein if it is set that the refresh rate of the displaying screen is M, the rotational speed of the rotating assembly is N, the plane value required for rendering the three-dimensional graphic to be displayed is S, the viewing distance is D, and the interpupillary distance of the person is L, then M=NS, and S≥[360/2 arctan(L/2D)], wherein [ ] represents rounding up to an integer.

2. The displaying device according to claim 1, wherein S=a[360/2 arctan(L/2D)], and a is a positive integer.

3. The displaying device according to claim 1, wherein a rotational speed of the rotating assembly is greater than or equal to 24 rps.

4. The displaying device according to claim 1, wherein the optical assembly is any one of a columnar array lens, a peep-proof protection film or a unidirectional grating.

5. The displaying device according to claim 1, wherein the displaying device further comprises: an electric-power supplying assembly, wherein the electric-power supplying assembly is for supplying electric power to the displaying screen and the controlling assembly.

6. The displaying device according to claim 5, wherein the displaying device further comprises a base, a displaying-screen support and connectors;
   the rotating assembly comprises an electric motor, the driving assembly comprises a turnplate, and the controlling assembly comprises a circuit board; and the electric-power supplying assembly comprises: a wireless-electric-power-supply emitting support, an emitting coil provided on the wireless-electric-power-supply emitting support, a wireless-electric-power-supply receiving support, and a receiving coil provided on the wireless-electric-power-supply receiving support;

the wireless-electric-power-supply emitting support is provided on the base, and the electric motor passes through a through-hole area in a center of the wireless-electric-power-supply emitting support and is arranged on the base;

the wireless-electric-power-supply receiving support and the turnplate are sequentially provided on the electric motor, and are individually connected to a main shaft of the electric motor by the connectors; and the displaying screen is provided on the displaying-screen support, the displaying-screen support is provided on the turnplate, and the circuit board is provided on one side of the turnplate that is further away from the displaying screen.

7. The displaying device according to claim 6, wherein the displaying device further comprises: a light screen, wherein the light screen is provided between the displaying-screen support and the turnplate.

8. The displaying device according to claim 1, wherein the displaying device further comprises: a transparent protective cover, wherein the displaying screen is located inside a space formed by the transparent protective cover.

9. A displaying method using the displaying device according to claim 1, wherein the displaying method comprises:

during rotation of the displaying screen, inputting to the displaying screen sequentially a plurality of different two-dimensional images that are obtained by rendering of a three-dimensional graphic to be displayed, wherein an time interval between the inputs of any neighboring two of the two-dimensional images is less than or equal to a human-eye visual-persistence duration; and controlling the displaying screen to display the inputted images.

10. A calculating and processing device, wherein the calculating and processing device comprises:

a memory storing a computer-readable code; and one or more processors, wherein when the computer-readable code is executed by the one or more processors, the calculating and processing device implements the displaying method according to claim 9.

11. A computer program product, wherein the computer program is stored on a nor-transitory computer readable medium and comprises a computer-readable code, and when the computer-readable code is executed on a calculating and processing device, the computer-readable code causes the calculating and processing device to implement the displaying method according to claim 9.

12. A device for generating data, wherein the device comprises:

an image acquiring module configured for acquiring, from different angles, data of a plurality of different two-dimensional images of a three-dimensional graphic to be displayed; and an outputting module configured for outputting the data of the plurality of different two-dimensional images to the controlling assembly of the displaying device according to claim 1.

13. The device for generating data according to claim 12, wherein the image acquiring module comprises a plurality of cameras;

the plurality of cameras surround the three-dimensional graphic to be displayed, and the cameras are configured for rendering the three-dimensional graphic to be displayed from the angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the outputting module is configured for numbering the data of the plurality of different two-dimensional images, and outputting the numbered data of the plurality of different two-dimensional images to the controlling assembly of the displaying device.

14. A method for generating data, wherein the method is applied to the device for generating data according to claim 12, and the method comprises:

acquiring, from different angles, data of a plurality of different two-dimensional images of a three-dimensional graphic to be displayed; and outputting the data of the plurality of different two-dimensional images to the controlling assembly of the displaying device.

15. The method for generating data according to claim 14, wherein the step of acquiring, from the different angles, the data of the plurality of different two-dimensional images of the three-dimensional graphic to be displayed comprises:

by using a plurality of cameras that surround the three-dimensional graphic to be displayed, rendering the three-dimensional graphic to be displayed from angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the step of outputting the data of the plurality of different two-dimensional images to the controlling assembly of the displaying device comprises:

numbering the data of the plurality of different two-dimensional images, and outputting the numbered data of the plurality of different two-dimensional images to the controlling assembly of the displaying device.

16. A calculating and processing device, wherein the calculating and processing device comprises:

a memory storing a computer-readable code; and one or more processors, wherein when the computer-readable code is executed by the one or more processors, the calculating and processing device implements the displaying method according to claim 14.

17. A displaying system, wherein the displaying system comprises: the displaying device according to claim 1 and a device for generating data, wherein the device comprises:

an image acquiring module configured for acquiring, from different angles, data of a plurality of different two-dimensional images of a three-dimensional graphic to be displayed; and an outputting module configured for outputting the data of the plurality of different two-dimensional images to the controlling assembly of the displaying device; and the device for generating data is electrically connected to the controlling assembly of the displaying device.

18. The displaying system according to claim 17, wherein the image acquiring module comprises a plurality of cameras;

the plurality of cameras surround the three-dimensional graphic to be displayed, and the cameras are configured for rendering the three-dimensional graphic to be displayed from the angles of the cameras toward the three-dimensional graphic to be displayed, and acquiring data of the two-dimensional images of the three-dimensional graphic to be displayed at the angles, wherein optical axes of the plurality of cameras intersect at one point, and a quantity of the cameras is equal to the plane value required for rendering the three-dimensional graphic to be displayed; and the outputting module is configured for numbering the data of the plurality of different two-dimensional images, and outputting the numbered data of the plurality of different two-dimensional images to the controlling assembly of the displaying device.

\* \* \* \* \*